United States Patent Office 3,297,122
Patented Jan. 10, 1967

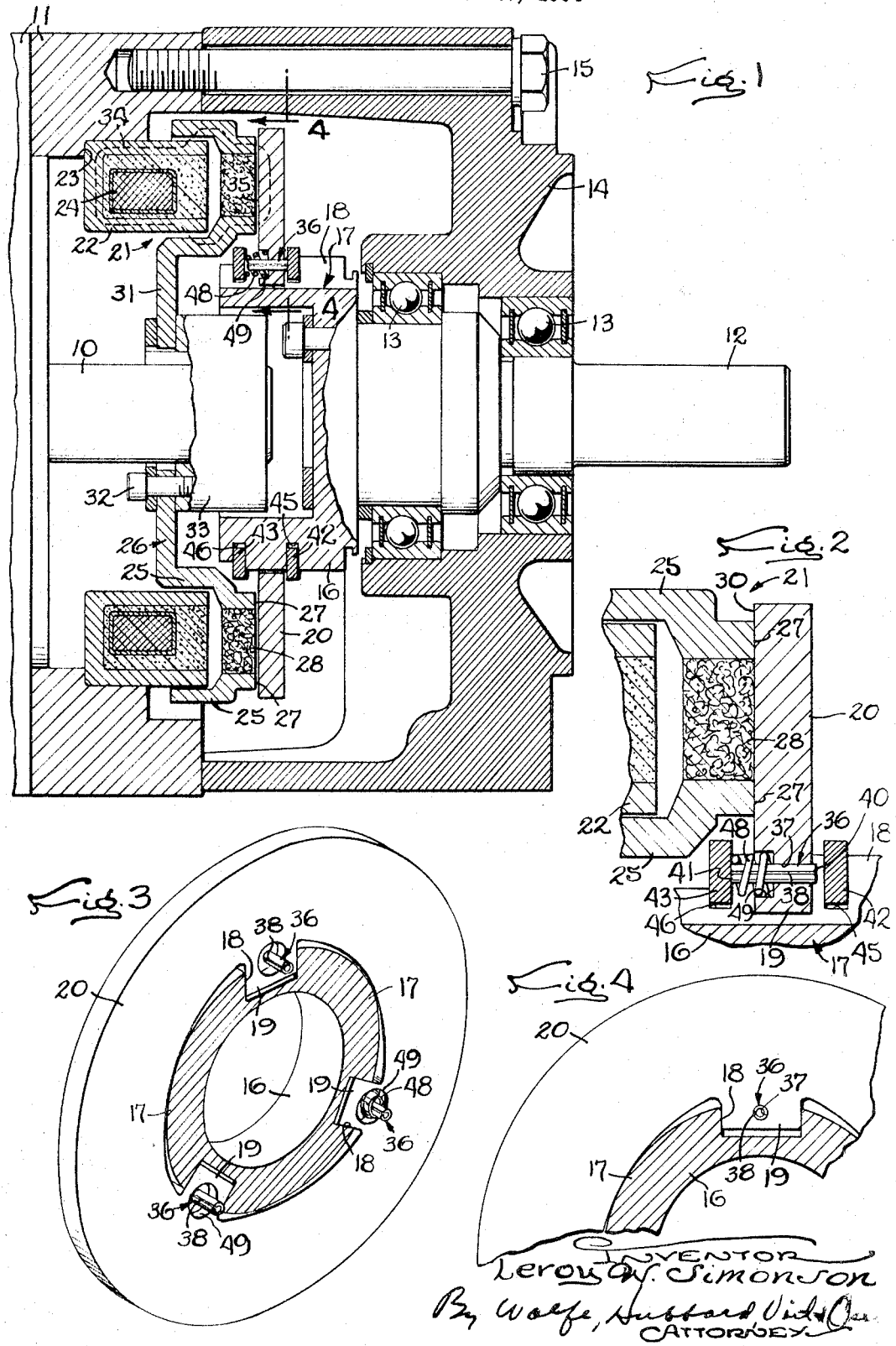

3,297,122
WEAR TAKE-UP DEVICE FOR MAGNETIC
FRICTION COUPLINGS
Leroy W. Simonson, Beloit, Wis., assignor to Warner
Electric Brake & Clutch Company, South Beloit, Ill.,
a corporation of Delaware
Filed Nov. 27, 1964, Ser. No. 414,336
7 Claims. (Cl. 192—111)

This invention relates to friction couplings in which a coupling torque is derived by axial gripping engagement between relatively rotatable armature and magnet rings, the armature ring being a centrally apertured disk mounted for axial shifting. The invention has more particular reference to a device for automatically taking up wear at the friction faces of the rings and maintaining the same separated by a narrow gap of predetermined axial width when the magnet is inactive, the device being an improvement over that disclosed in Patent No. 2,705,056. In such devices, the axial position of the armature is maintained by friction which is overcome by attraction of the armature to the magnet during which wear at the armature face is taken up. Then, when the armature is released, it is moved away from the magnet without opposition by the friction force and by a spring force of lesser magnitude than the friction force.

The general object is to provide an automatic wear take-up device of the above character which, as compared to the patented construction, is simpler in construction, lower in cost, and provides for greater overall radial compactness.

Another object is to maintain the idle position of the armature disk by friction derived within the disk itself through the action of one or more members carried by and projecting through the disk.

A further object is to utilize the radial expansion of a so-called standard spring pin to derive the friction force for holding the idle armature position.

The invention also resides in the novel construction and arrangement of the armature positioning member and the manner of its actuation.

Other objects and advantages of the invention will become apparent from the following detailed description taken in connection with the accompanying drawings, in which:

FIGURE 1 is a diametrical sectional view of a friction clutch embodying the improved wear take-up device.

FIG. 2 is an enlarged fragmentary view of a part of FIG. 1 showing the parts in a different position.

FIG. 3 is a broken away perspective view of the clutch armature and its mounting.

FIG. 4 is a fragmentary section taken along the line 4—4 of FIG. 1.

The improved wear take-up device is shown in the drawings incorporated in a so-called stationary field magnetic friction clutch for coupling a driving shaft 10 journaled in a support 11 with a driven shaft 12 journaled intermediate its ends in axially spaced bearings 13 in a stationary support 14 secured to the support 11 by bolts 15. Beyond the inner bearing, the enlarged inner end 16 of the driven shaft is formed with angularly spaced spline teeth 17 separated by square sided and parallel grooves 18 which mate with complemental and inwardly projecting teeth 19 spaced around a central aperture in a relatively flat disk or ring 20 composed of magnetic material and constituting the armature of a magnet 21. The armature is thus supported by the shaft end 16 for free shifting along the clutch axis.

Herein, the magnet includes an annular core 22 of U-shaped radial cross-section secured at 23 to the support 11 and enclosing a multiple turn annular winding 24. The concentric pole legs of the core telescope closely with concentric pole pieces 25 of a rotor 26 rigidly joined and magnetically separated and terminating in pole faces 27 flush with each other and coacting with segments 28 of friction material to define the driving face of the clutch opposing the inner face 30 of the armature disk 20 and adapted axially for gripping engagement therewith.

A flange 31 turned inwardly from the inner pole piece 25 is clamped by bolts 32 against a collar 33 on the inner end of the driving shaft 10. The axial position of the pole faces is thus fixed so that upon energization of the winding 24, the armature will be drawn axially along the spline grooves 18 into gripping engagement with the pole faces 27 and segments 28 by magnetic flux threading the toroidal circuit 34.

As in the patented construction above referred to, the armature disk 20 is urged axially and continuously away from the pole faces of the magnet and, when the magnet is deenergized, is pushed away from the magnet face and then frictionally held separated from magnet pole faces by a narrow axial gap 35 of fixed width, thus automatically taking up and compensating for wear at the armature and magnet pole faces during service use of the clutch. The gap is so narrow, usually a few thousandths of an inch, that it will be overcome when the magnet is again energized.

In accordance with the present invention, the friction force for maintaining the armature position while the clutch is deenergized is developed by radial pressure applied to the opposed surfaces, one formed in the armature itself and the other on an elongated member 36 projecting through the armature along the axis thereof. Preferably, a plurality, three in the present instance, of such members are employed and extended through holes 37 formed in and angularly spaced around the armature disk near the inner periphery thereof and paralleling the disk axis. For the sake of simplicity of construction, each member 36 is a so-called spring pin comprising a piece of resilient sheet metal rolled up into the form of a tube of cylindrical cross-section with the sides of the sheet angularly spaced apart to define a narrow slot 38 extending along one side of the tube over the full length thereof so as to allow for radial contraction and expansion of the tube. The pin when free has a somewhat larger outside diameter than the internal diameter of the holes 37 so that when the pin is contracted and pressed axially into the hole, a radial pressure is developed between the opposed surfaces thus creating the desired friction force resisting axial shifting of the armature along the pins. Three such spring pins and armature holes are employed in the present instance so that the sum of the friction forces thus developed equals that required to hold the position of the armature disk while the magnet remains deenergized but is substantially less than the attractive force of the magnet as exerted on the armature when the magnet is energized with the armature separated from the pole faces 27 by the gap 35.

The length of the spring pins 36 are substantially greater than the axial thickness of the armature disk and the ends 40 and 41 of the portions which project from opposite sides of the disk are spaced apart a distance shorter, by the desired width of the gap, than the axial spacing of two annular abutments 42 and 43 disposed on opposite sides of the disk and axially fixed relative to and supported by the inner hub 16 of the driven shaft 12. The snap rings are of any suitable kind being first expanded to receive the hub 16 and then contract resiliently into and around grooves 45, 46 which are formed in the hub and intersect the spline grooves 18 and are axially spaced apart to properly locate the abutments.

The armature disk is urged away from the magnet pole faces 27 by a force which is less than the initial attractive force of the magnet when the latter is energized and also less than the friction force developed between the pins 36 and the armature. Herein this force is the sum of the forces of three helical compression springs 48 coiled around the projecting end portions of the respective pins between the armature and the magnet so as to bear at opposite ends against the snap ring 43 and the armature disk. One end of each spring is seated in a shallow recess 49.

Under the combined forces of these springs when the magnet is deenergized, the armature disk is pushed away from magnet pole faces 27 and held in a position (FIG. 1) determined by engagement between the ends 40 of the pins 36 and the snap ring 42. The gap 35 of the desired constant axial width is thus established. When the magnet is next energized, the force of the springs is overcome and the disk is drawn toward and against the pole faces 27 which will be a distance greater than the width of the gap by an amount equal to the amount of wearing off of the armature and pole faces due to rubbing friction at the clutch surfaces during the preceding clutch engagement. Due to such wear, the friction between the armature disk and the pins 36 is overcome and the disk slides along the latter an extremely small distance equal to the amount of such wear. Then, with the armature in this new position relative to the pins, it will, when the magnet is deenergized, be moved reversely by the springs 48 to a position determined by engagement of the ends 40 of the pins with the snap ring 42 as shown in FIG. 1. The idle gap 35 thus established is of a width identical to that of the former gap.

It will be apparent that with the coiled springs 48 and the elements deriving the friction force for holding the idle position of the armature self-contained within the armature itself, the improved wear take-up device occupies a space of such small radial and circumferential width that the roll pins may be disposed inside the outside diameter of the disk support 16. Thus, the holes 47 for the friction pins 36 may be extended through the inwardly projecting teeth 19 of the armature and thus disposed within the spline grooves 18. As a result of such overall radial compactness, the presence of the automatic wear take-up device does not influence the sizing of the clutch or brake.

I claim as my invention:

1. In a magnetic friction coupling having a centrally apertured armature disk and a magnet ring mounted for relative rotation and adapted to be drawn into axial gripping engagement threading a toroidal flux through the disk and magnet and including a support mounting the disk for axial shifting, a device for automatically taking up wear at the friction faces of said disk and magnet and maintaining a narrow axial gap of predetermined width between such faces when said flux is dissipated, said device comprising an elongated member paralleling the axis of said disk and extending through a hole in the disk, said member including resilient means continuously acting to develop radial pressure between the disk and member and maintain a predetermined friction force yieldably resisting axial shifting of the member relative to the disk, two abutments axially fixed relative to said support beyond opposite ends of said member and axially spaced apart a distance greater than the effective length of the member by the desired width of said gap, and spring means acting between said disk and one of said abutments to urge the disk and the member thereon axially and away from said magnet with a force of lesser magnitude than said friction force.

2. A wear take-up device as defined in claim 1 in which said resilient means is carried by said member and said radial pressure is exerted on the wall defining said hole.

3. A wear take-up device as defined in claim 1 in which said member comprises a tube of resilient material split longitudinally throughout its length and contracted within said hole so as to derive said radial pressure by radial expansion against the wall of said hole.

4. A wear take-up device as defined by claim 1 in which said spring means comprises a helical coil surrounding one end portion of said member compressed between said disk and said one abutment.

5. A friction coupling as defined in claim 1 in which said abutments comprise snap rings radially contracted into annular grooves formed in and axially spaced along said support.

6. A wear take-up device as defined in claim 1 including a plurality of additional members duplicating the construction and operation of said first member, said members being angularly spaced apart substantially equidistantly around the axis of the disk.

7. A wear take-up device as defined in claim 1 in which radial teeth spaced around the inner periphery of said disk are splined onto said support and the hole in said disk extends through one of said teeth.

References Cited by the Examiner

UNITED STATES PATENTS 3,007,561 11/1961 Harting _____ 192—111
3,086,634 4/1963 Reed _____ 192—111

DAVID J. WILLIAMOWSKY, *Primary Examiner.*

A. T. McKEON, *Assistant Examiner.*